US 9,556,825 B2

(12) United States Patent
Kobayashi et al.

(10) Patent No.: US 9,556,825 B2
(45) Date of Patent: Jan. 31, 2017

(54) VALVE DEVICE

(71) Applicant: DENSO CORPORATION, Kariya, Aichi-pref. (JP)

(72) Inventors: Takashi Kobayashi, Okazaki (JP); Katsuya Torii, Anjo (JP)

(73) Assignee: DENSO CORPORATION, Kariya (JP)

(*) Notice: Subject to any disclaimer, the term of this patent is extended or adjusted under 35 U.S.C. 154(b) by 540 days.

(21) Appl. No.: 13/862,794

(22) Filed: Apr. 15, 2013

(65) Prior Publication Data
US 2013/0340731 A1 Dec. 26, 2013

(30) Foreign Application Priority Data

Jun. 25, 2012 (JP) ................. 2012-141821

(51) Int. Cl.
F16K 31/53 (2006.01)
F16K 1/22 (2006.01)
F02M 26/54 (2016.01)
F02M 26/70 (2016.01)
F02M 25/07 (2006.01)

(52) U.S. Cl.
CPC ......... *F02M 25/0771* (2013.01); *F02M 26/54* (2016.02); *F02M 26/67* (2016.02); *F02M 26/70* (2016.02); *F16K 1/225* (2013.01); *F16K 31/535* (2013.01)

(58) Field of Classification Search
CPC . Y02T 10/121; Y02T 10/144; F02M 25/0789; F02M 25/0773; F02M 25/0793; F02M 25/0771; F02M 26/54; F02M 26/67; F02M 26/70; F02D 9/1095; F02D 9/1035; F02D 41/0077; F02B 2275/20; F02B 1/04; F16K 31/535; F16K 1/225

USPC ....................... 123/568.11–568.32
See application file for complete search history.

(56) References Cited

U.S. PATENT DOCUMENTS 8,172,202 B2    5/2012  Mendoza et al.
8,720,851 B2 *  5/2014  Furukawa et al. ....... 251/129.04
2004/0170346 A1 9/2004  Komeda et al.
(Continued)

FOREIGN PATENT DOCUMENTS

JP  2010-281283  12/2010
JP  2011-117548   6/2011
(Continued)

OTHER PUBLICATIONS

Office Action (2 pages) dated Apr. 15, 2014, issued in corresponding Japanese Application No. 2012-141821 and English translation (2 pages).

(Continued)

Primary Examiner — Sizo Vilakazi
(74) Attorney, Agent, or Firm — Nixon & Vanderhye P.C.

(57) ABSTRACT

A valve device has a valve that opens and closes a passage, and a cantilever bearing member rotatably supporting a rotating shaft of the valve. The cantilever bearing member has rolling-element bearings arranged in series in an axial direction of the rotating shaft. One of the rolling-element bearings located the closest to the passage has a rolling element, an inner race, an outer race and a seal portion. A space is defined between the inner race and the outer race to receive the rolling element. The seal portion made of rubber tightly seals the space on a side adjacent to the passage.

5 Claims, 2 Drawing Sheets

(56) References Cited

U.S. PATENT DOCUMENTS

| | | | | |
|---|---|---|---|---|
| 2006/0025257 A1* | 2/2006 | Tanabe et al. | ............ | B32B 7/12 |
| | | | | 474/199 |
| 2007/0017491 A1* | 1/2007 | Maeda | ..................... | 123/568.18 |
| 2007/0240690 A1* | 10/2007 | Nanba | ...................... | 123/568.18 |
| 2012/0325183 A1* | 12/2012 | Hatano | .................... | 123/568.11 |

FOREIGN PATENT DOCUMENTS

| | | |
|---|---|---|
| JP | 2012-107572 | 6/2012 |
| JP | 2013-096305 | 5/2013 |

OTHER PUBLICATIONS

Chinese Office Action issued in App. No. 201310209268.1 dated Feb. 2, 2016 (w/ translation).

\* cited by examiner

VALVE DEVICE

CROSS REFERENCE TO RELATED APPLICATION

This application is based on Japanese Patent Application No. 2012-141821 filed on Jun. 25, 2012, the disclosure of which is incorporated herein by reference in its entirety.

TECHNICAL FIELD

The present disclosure relates to a valve device.

BACKGROUND

Conventionally, a valve device for an exhaust gas recirculation (EGR) unit is known to have a cantilever bearing structure. JP-A-2007-285311 (US 2007/0240690) describes such a valve device in which a rotating shaft and a valve are rotatably supported from only one side of a passage.

In such a valve device, a bearing member supporting the rotating shaft is placed on one axial side of the rotating shaft, and has a metallic bearing and a ball bearing. The metallic bearing is placed to be closer to the passage than a ball bearing is. The metallic bearing is press-fitted and supported in a bearing hole of a housing, and a clearance is defined between the metallic bearing and the rotating shaft in a radial direction. And the ball bearing is supported between an inner race press-fitted into the rotating shaft and an outer race press-fitted into the bearing hole.

Thus, the metallic bearing having a high heat resistance and the like is placed to be closer to the passage, and the ball bearing, which is a generic bearing, is placed to be further from the passage. Furthermore, with consideration for the clearance between the metallic bearing and the rotating shaft in the radial direction, the metallic bearing and the ball bearing are located away from each other in an axial direction to restrict axial runout. And an oil seal is placed between the metallic bearing and the ball bearing to keep fluid-tightness.

However, while needs for reducing a producing cost of a valve device are getting increased, the cantilever bearing structure is also required to be simplified to reduce the producing cost.

SUMMARY

It is an object of the present disclosure to provide a valve device having a cantilever bearing member at lower cost.

According to an example of the present disclosure, a valve device includes a valve and a cantilever bearing member. The valve opens and closes a passage, through which a gas exhausted from an internal combustion engine passes. The cantilever bearing member rotatably supports a rotating shaft of the valve on only one side of the passage. The cantilever bearing member has a plurality of rolling-element bearings arranged in series in an axial direction of the rotating shaft. One of the plurality of rolling-element bearings is located the closest to the passage among the plurality of rolling-element bearings. The rolling-element bearing has a rolling element, an inner race, an outer race and a seal portion. A space is defined between the inner race and the outer race and receives the rolling element. The seal portion which is made of rubber tightly seals the space on a side adjacent to the passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

Figure 1A:
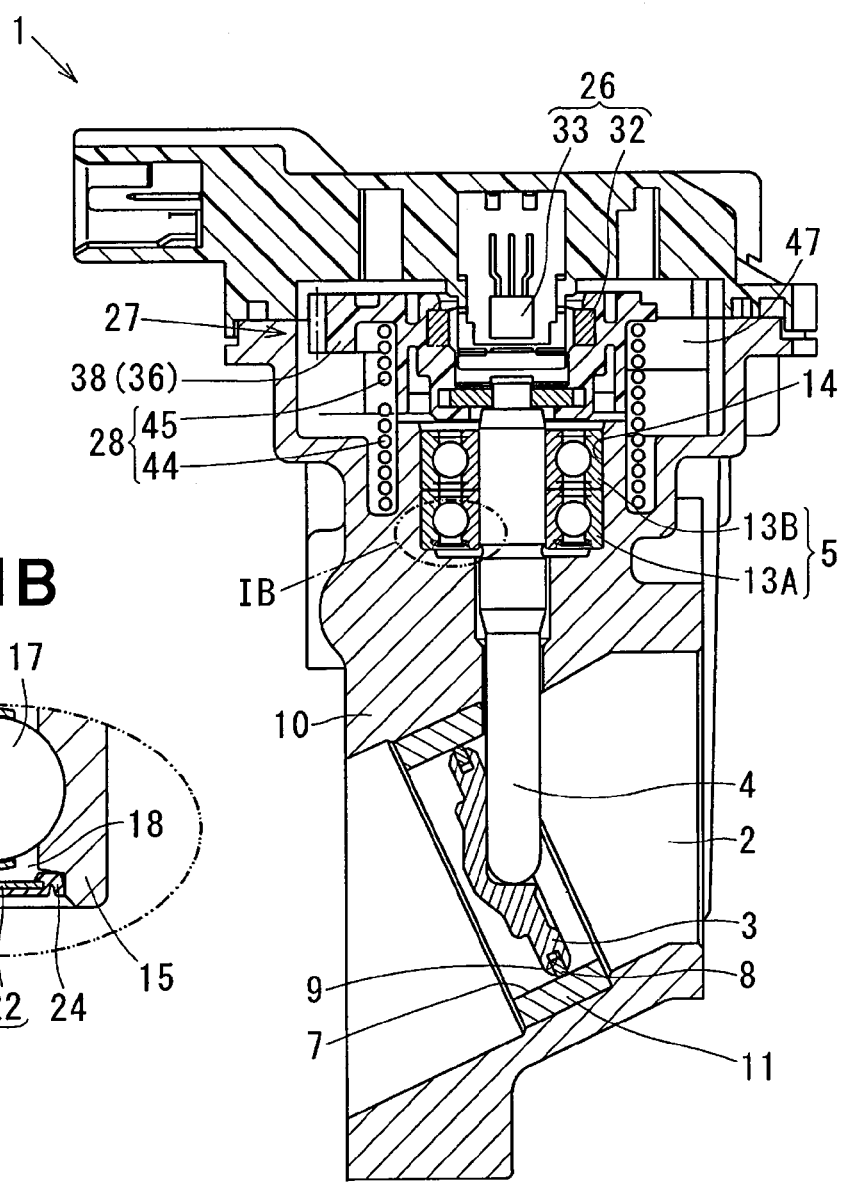
FIG. 1A is a cross-sectional view illustrating a valve device according to an embodiment.

A valve device 1 according to an embodiment will be described with reference to FIGS. 1A, 1B and 2.

The valve device 1 opens and closes a passage 2 through which an exhaust gas emitted from an internal combustion engine (not shown) passes. For example, the valve device 1 is employed to an exhaust gas recirculation (EGR) unit, which recirculates the exhaust gas to an air intake side, and opens and closes an exhaust gas recirculation (EGR) passage corresponding to the passage 2. The valve device 1 has a valve 3 and a cantilever bearing member 5. The valve 3 opens and closes the passage 2, and the cantilever bearing member 5 supports a rotating shaft 4 of the valve 3 to rotate integrally with the valve 3.

Structures of the valve 3 and the cantilever bearing member 5 will be described below.

The valve 3 is a discoid butterfly valve having a predetermined thickness, and rotates to open and close the passage 2. An outer edge of the valve 3 has a seal ring 8 to clear the gap between the valve 3 and an inner wall 7 of the passage 2.

The seal ring 8 has a C-shape, in other words, a nearly ring shape with a separated part (not shown). The seal ring 8 is inserted to a groove 9 defined on the outer edge of the valve 3, and rotates with the valve 3 integrally. When the passage 2 is closed, the seal ring 8 contacts the inner wall 7 slidingly and circularly. Then, the separated part of the seal ring 8 shrinks and is elastically deformed to clear the gap between the outer edge of the valve 3 and the inner wall 7.

A nozzle 11, which is press-fitted into a housing 10 of the valve device 1, holds the valve 3 to rotate. The nozzle 11 has a cylindrical shape, and an inner wall of the nozzle 11 defines the inner wall 7, such that the seal ring 8 contacts the inner wall of the nozzle 11 slidingly. The valve 3 and the nozzle 11 are made of stainless steel, for example, to have heat resistance and corrosion resistance. The housing 10 is made of aluminum alloy, for example, in terms of reducing weight.

The valve 3 is attached to the rotating shaft 4 by welding and the like to be integrated with the rotating shaft 4. The valve 3 inclines to the rotating shaft 4 to make an acute angle. The cantilever bearing member 5 is mounted to the housing 10, and supports the rotating shaft 4 to rotate.

The bearing member 5 has a cantilever structure as a supporting structure for the rotating shaft 4. In such a structure, the cantilever bearing member 5 is placed on one axial side of the rotating shaft 4 to support the rotating shaft 4 from one side of the passage 2 without intersecting the passage 2. The bearing member 5 has a first rolling-element bearing 13A and a second rolling-element bearing 13B arranged in series in an axial direction.

The first rolling-element bearing 13A is located the closest to the passage 2 than the second rolling-element bearing 13B is. As shown in FIG. 1B, the first rolling-element 13A has a rolling element 17, an inner race 15, an outer race 16, and a seal portion 21.

Figure 1B:
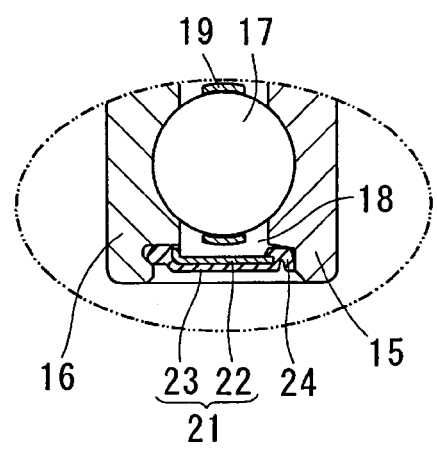
FIG. 1B is an enlarged view illustrating a section IB of FIG. 1A.
Figure 2:
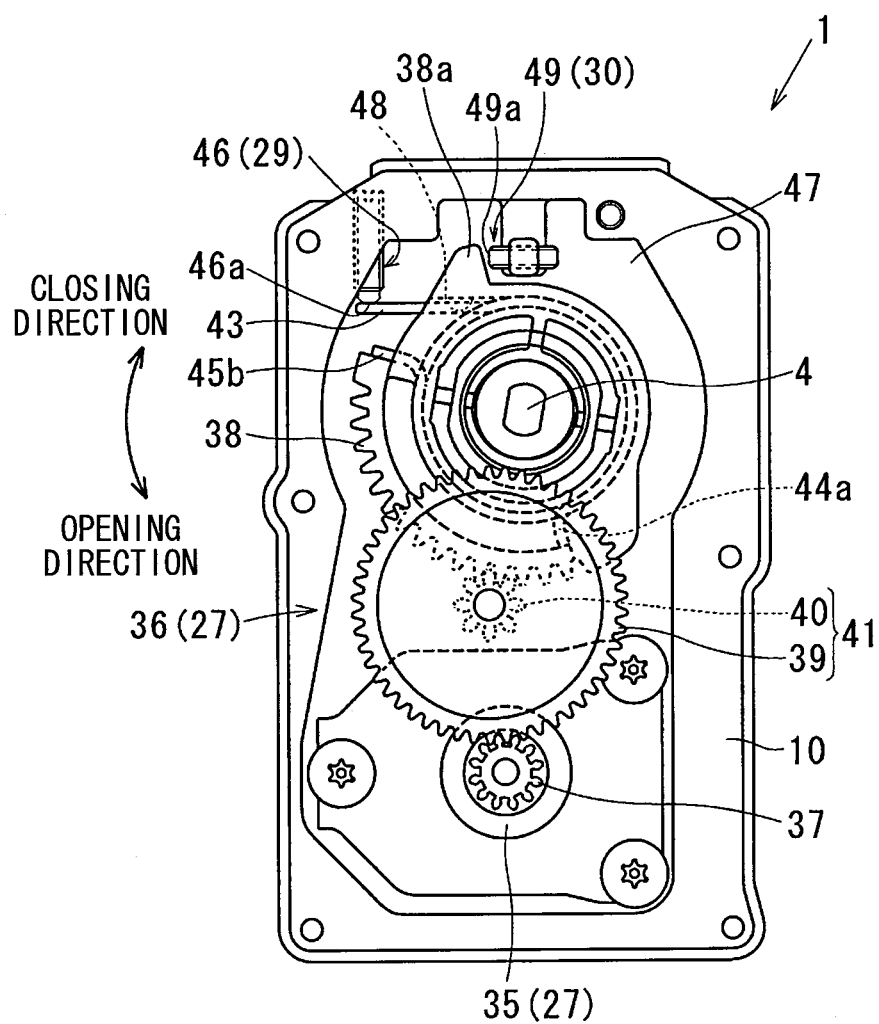
FIG. 2 is a schematic side view illustrating the valve device without a cover.

As shown in FIG. 1A, each of the first rolling-element bearing 13A and the second rolling-element bearing 13B is held in a bearing hole 14 defined in the housing 10. The inner race 15 is placed to the rotating shaft 4 by press-fitting, and the outer race 16 is placed to the bearing hole 14 by press-fitting. As shown in FIG. 1B, a space 18 having a ring shape is defined between the inner race 15 and the outer race 16, and holds a plurality of the rolling elements 17 at regular intervals in a circumferential direction with retainers 19. And the space 18 is filled with grease so that the rolling element 17 rolls smoothly. A spherical (ball) body, a cylindrical body and the like may be applicable to the rolling element 17.

In the first rolling-element bearing 13A, both ends of the space 18 in the axial direction are sealed by seal portions respectively. Specifically, one side of the space 18 near the passage 2 is sealed by the seal portion 21, and another side of the space 18 further from the passage 2 is sealed by a well-known steel seal portion.

On the other hand, in the second rolling-element bearing 13B, both sides of the space 18 of the rolling-element bearing 13B, closer to and further from the passage 2, are sealed by the steel seal portion.

The seal portion 21 has a steel plate 22 and a rubber plate 23. The rubber plate 23 is located adjacent to the passage 2 than the steel plate 22 is. The steel plate 22 is inserted on the inner side of the rubber plate 23, and the steel plate 22 and the rubber plate 23 are contact with each other liquid-tightly between the inner race 15 and the outer race 16. Moreover, the seal portion 21 contacts the inner race 15 slidingly with a lip seal 24 having an S-shaped cross-section, for example, to keep the liquid tightness between the seal portion 21 and the inner race 15.

The valve device 1 also has a rotation angle sensor 26, an actuator 27, a biasing portion 28, an opener 29 and a stopper 30 in addition to the valve 3 and the bearing member 5.

The rotation angle sensor 26 has a permanent magnet 32 and a Hall Integrated Circuit (IC) 33. The permanent magnet 32 rotates with the rotating shaft 4 integrally, and the Hall IC 33 produces Hall voltage depending on magnetic flux produced by the permanent magnet 32. Then, the rotation angle sensor 26 produces and outputs a signal depending on a rotation angle of the valve 3, in other words, a rotation angle of the rotating shaft 4 rotating integrally. The signal is output from the rotation angle sensor 26 to an engine control unit (ECU) controlling an internal combustion engine, for example. And then, the ECU determines the rotation angle of the valve 3 based on the output signal output from the rotation angle sensor 26, and controls an actuation of the valve 3 by commanding the actuator 27 with the determined rotation angle.

The actuator 27 has an electric motor 35 and a gear reducer 36. The electric motor 35 produces a torque rotating the valve 3, and the gear reducer 36 amplifies the torque and transmits the amplified torque to the valve 3.

The electric motor 35 rotates in a normal direction or in a reverse direction depending on a command from the ECU. The ECU commands the electric motor 35 based on the detected rotation angle to rotate the valve 3 in an opening direction or in a closing direction, and these directions are shown in FIG. 2.

The gear reducer 36 has a motor gear 37, a valve gear 38 and a middle gear 41. The motor gear 37 is mounted to an output shaft of the electric motor 35. The valve gear 38 is mounted to the rotating shaft 4 and rotates with the valve 3 integrally. The middle gear 41 coaxially has a large gear 39 having a large diameter and a small gear 40 having a small diameter. The large gear 39 is engaged with the motor gear 37, and the small gear 40 is engaged with the valve gear 38.

To be understood, expressions, lower and upper, will be used hereafter to express directions according to FIG. 1A.

The biasing portion 28 has a lower torsion spring 44 and an upper torsion spring 45 connected with each other by a hook 43 having an U shape. The lower torsion spring 44 and the upper torsion spring 45 are twisted in different directions from each other and set to the rotating shaft 4 coaxially. The lower torsion spring 44 has an end part 44a fixed to the housing 10 and the other end part connected to the hook 43. And as for the upper torsion spring 45, an end part 45b of the spring 45 is fixed to the valve gear 38 and rotates with the valve gear 38 integrally, and the other end part of the spring 45 is connected to the hook 43.

A base angle is defined as a rotation angle in a case where an inner wall of the nozzle 11 and a face of the valve 3 are perpendicular with each other, in other words, the separated part of the seal ring 8 becomes smallest to totally close the passage 2. To be understood, hereafter, an area extending in the opening direction from the base angle is defined as a plus side, and an area extending in a closing direction opposite from the opening direction from the base angle is defined as a minus side.

By a function of the opener 29 which will be described below, when the valve 3 is on the plus side, the lower torsion spring 44 biases the valve 3 to rotate in the closing direction. And when the valve 3 is on the minus side, the upper torsion spring 45 biases the valve 3 to rotate in the opening direction.

When a rotation angle is on the minus side, the opener 29 releases the valve 3 from a biasing force produced by the lower torsion spring 44. The opener 29 is defined by a screw 46 screwed into the housing 10, and an end part 46a of the screw 46 is exposed to a gear chamber 47 holding the gear reducer 36. And a screwing amount of the screw 46 is adjusted so that the end part 46a catches the hook 43 at the base angle when the valve 3 rotates in the closing direction from the plus side.

Therefore, biasing force state, in which the lower torsion spring 44 and the upper torsion spring 45 give the biasing force to the valve 3, is changed depending on rotation angles. Such variations will be described below.

When a rotation angle is on the plus side, a hook lever 48 placed to the valve gear 38 catches the hook 43 together, and the hook 43 rotates with the valve 3 integrally. At this time, the end part 44a of the spring 44 is fixed to the housing 10, and the other end of the spring 44, that is the hook 43, rotates with the valve gear 38 integrally. Accordingly, the lower torsion spring 44 transmits a biasing force via the engagement between the hook 43 and the hook lever 48 to the valve 3, and biases the valve 3 to rotate in the closing direction. At this time, the valve gear 38 holds both end parts of the upper torsion spring 45, so the upper torsion spring 45 does not work substantially.

When a rotation angle is on the minus side, the end part 46a catches the hook 43 together, and the hook 43 stands still relatively to the valve 3. Accordingly, the housing 10 holds both end parts of the lower torsion spring 44 not to work, and the valve 3 is released from the biasing force. Then, an end part of the upper torsion spring 45, that is the hook 43, not the end part 45b, is fixed to the housing 10 via the screw 46, and the end part 45b rotates with the valve gear 38 integrally. Accordingly, the upper torsion spring 45 transmits a biasing force to the valve 3 via the engagement between the end part 45b and the valve gear 38, and biases the valve 3 to rotate in the opening direction.

A screw 49 screwed into the housing 10 defines the stopper 30, and the stopper 30 has a stopper angle predetermined on the minus side to restrict the valve 3 mechanically not to rotate in the closing direction in a large excess. The screw 49 is screwed into the housing 10, such that an end part 49a of the screw 49 is exposed to the gear chamber 47, as is the case with the screw 46.

A screwing amount of the screw 49 is adjusted so that the end part 49a catches the valve gear 38 together at the stopper angle when the valve 3 rotates in the closing direction from the plus side. The valve gear 38 has a projecting part 38a which is projecting in a radial direction, and the screw 49 controls rotation of the valve gear 38 by catching the projecting part 38a together at the stopper angle.

When the stopper angle is set on the minus side from the base angle, the valve 3 may be allowed to overshoot the base angle in the closing direction, and, for example, the valve 3 may remove deposit attached on the seal ring 8 and the inner wall 7.

According to the embodiment, the cantilever bearing member 5 has the cantilever structure in which the rotating shaft 4 is supported from one axial side. And the cantilever bearing member 5 also has the first rolling-element bearing 13A and the second rolling-element bearing 13B arranged in series in the axial direction on the one axial side of the rotating shaft 4 as a plurality of rolling-element bearings. In the first rolling-element bearing 13A located closer to the passage 2 than the second rolling-element bearing 13B, the space 18 defined between the inner race 15 and the outer race 16 is sealed by the rubber seal portion 21 on the passage 2 side.

In a result, by employing the first rolling-element bearing 13A and the second rolling-element bearing 13B, which are general-purpose bearings, instead of a metallic bearing having high heat resistance as the cantilever bearing member 5, a producing cost of the cantilever bearing member 5 can be reduced.

By arranging the first rolling-element bearing 13A and the second rolling-element bearing 13B in series in the axial direction, the first rolling-element bearing 13A can be located further from the passage 2, and a distance between the cantilever bearing member 5 and the passage 2 can be extended. Thus, the cantilever bearing member 5 can be restricted from having heat damage, so performance degradation of the rolling-element bearing 13A can be reduced.

Furthermore, as for the first rolling-element bearing 13A, the fluid-tightness can be secured by sealing the space 18 with the rubber seal portion 21 on the passage 2 side. At this time, heat damage of the rubber seal portion 21 can be reduced because the distance between the first rolling-element bearing 13A of the cantilever bearing member 5 and the passage 2 is extended.

Thus, according to the valve device 1 having the cantilever structure to open and close the passage 2, producing cost of the cantilever bearing member 5 can be reduced without reducing performance.

In the embodiment, the cantilever bearing member 5 has the first rolling-element bearing 13A and the second rolling-element bearing 13B. Alternatively, the cantilever bearing member 5 may have three or more rolling-element bearings arranged in series in the axial direction.

In the embodiment, the space 18 in the first rolling-element bearing 13A is sealed by the rubber seal portion 21 only on the passage 2 side. Alternatively, the space 18 may be sealed on an opposite side opposite from the passage 2 by the rubber seal portion 21 as well. Furthermore, as for the second rolling-element bearing 13B, the rubber seal portion 21 may be applicable instead of the steel seal portion to seal the space 18.

Such changes and modifications are to be understood as being within the scope of the present disclosure as defined by the appended claims.

What is claimed is:

1. A valve device comprising:
  a valve that opens and closes a passage; and
  a cantilever bearing member that rotatably supports a rotating shaft of the valve on only one side of the passage, wherein
  the cantilever bearing member has a plurality of rolling-element bearings that are arranged in series in an axial direction of the rotating shaft to be directly adjacent to each other,
  one of the plurality of rolling-element bearings is located the closest to the passage among the plurality of rolling-element bearings, and the rolling-element bearing that is located closest to the passage has
  a rolling element,
  an inner race and an outer race between which a space is defined to receive the rolling element, and
  a seal portion made of rubber and steel, such that the seal portion is configured to tightly seal the space on a side adjacent to the passage, wherein the rubber contacts both the inner race and the outer race.

2. The valve device according to claim 1, wherein gas exhausted from an internal combustion engine passes through the passage.

3. The valve device according to claim 1, wherein the rubber is a rubber plate, the steel is a steel plate, and the rubber plate is located closer to the passage than the steel plate.

4. The valve device according to claim 3, wherein the rubber plate forms a liquid-tight lip seal with an S-shaped cross-section adjacent to the inner race.

5. A valve device comprising:
  a valve that opens and closes a passage; and
  a cantilever bearing member that rotatably supports a rotating shaft of the valve on only one side of the passage, wherein
  the cantilever bearing member has a plurality of rolling-element bearings that are arranged in series in an axial direction of the rotating shaft to be directly adjacent to each other,
  adjacent two of the plurality of rolling-element bearings are in contact with each other in the axial direction,
  one of the plurality of rolling-element bearings is located the closest to the passage among the plurality of rolling-element bearings, the rolling-element bearing that is located closest to the passage has
  a rolling element,
  an inner race and an outer race between which a space is defined to receive the rolling element, and
  a seal portion made of rubber and steel, such that the seal portion is configured to tightly seal the space on a side adjacent to the passage, wherein the rubber contacts both the inner race and the outer race.

* * * * *